Dec. 5, 1961     E. H. SIEGLER, JR     3,011,389
SPECTROPHOTOMETER OPTICAL SYSTEM
Filed March 4, 1958
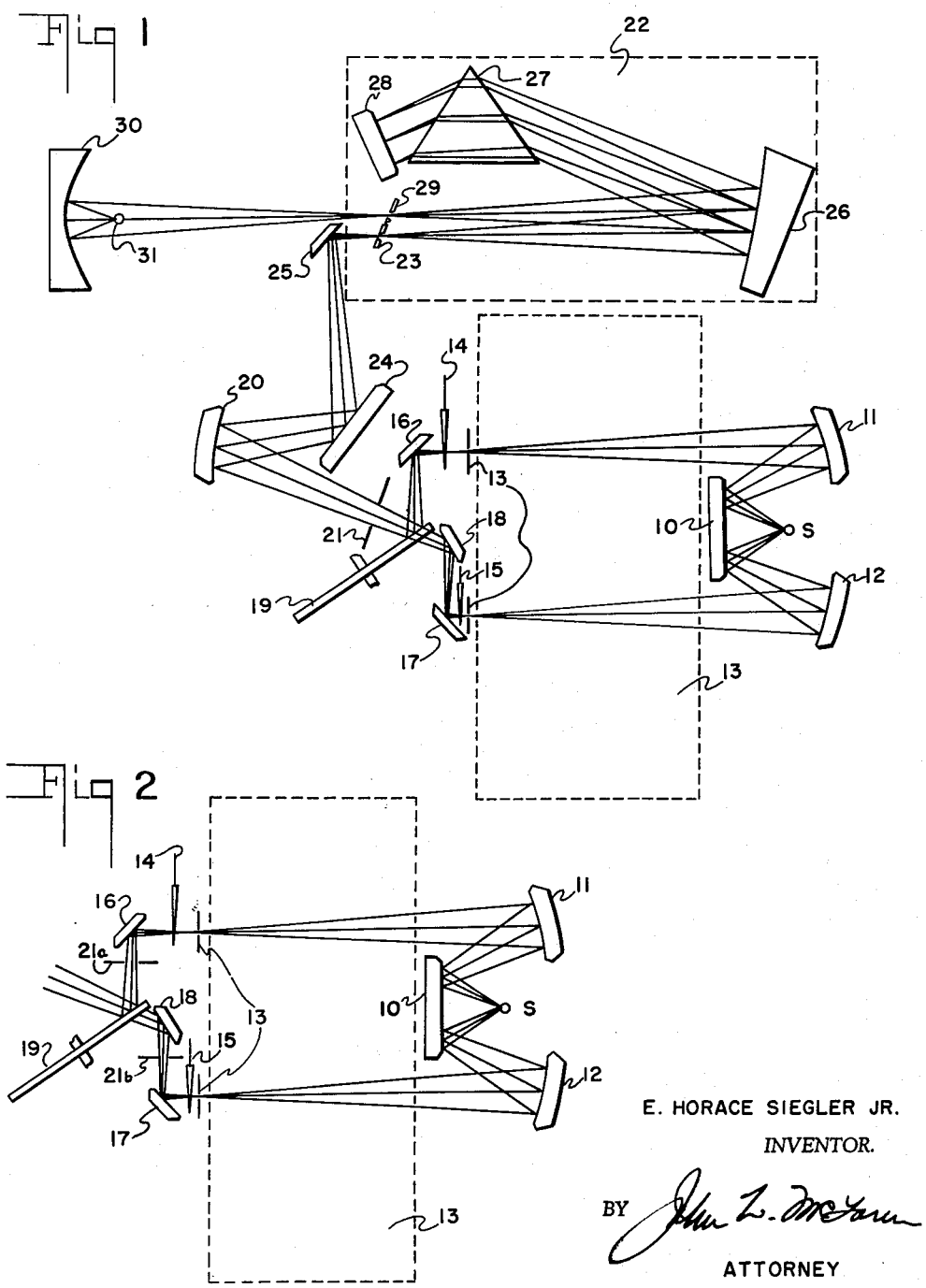
E. HORACE SIEGLER JR.
INVENTOR.
BY
ATTORNEY

United States Patent Office 3,011,389
Patented Dec. 5, 1961

3,011,389
SPECTROPHOTOMETER OPTICAL SYSTEM
Edouard Horace Siegler, Jr., Darien, Conn., assignor to The Perkin-Elmer Corporation, Norwalk, Conn., a corporation of New York
Filed Mar. 4, 1958, Ser. No. 719,167
5 Claims. (Cl. 88—14)

The present invention is concerned with a unique optical system and, more specifically, is designed to define the optical paths within a radiant energy spectrophotometer.

Radiant energy such as infrared is largely absorbed by glass and therefor must be transmitted within a spectrometer by means of reflective optical elements in the form of mirrors or operated upon, for purposes of dispersion, for instance, by optical elements such as prisms made of materials having tolerable infrared transmitting characteristics. Typical of these materials are sodium chloride, potassium bromide, lithium fluoride, calcium fluoride, cesium iodide, barium fluoride, etc.

The requirements of an optical system for an infrared spectrophotometer are most exacting in that unnecessary losses of radiant energy must be minimized and sources of error signal avoided wherever possible in order to achieve the maximum signal-to-noise ratio of the usable output signal in the system. One expedient widely relied upon in the art to eliminate a major source of error is the use of two beams of radiant energy, one of which is used as a reference beam and the other used as a sample beam. Both beams are derived from a single radiant energy source and, therefore, fluctuations of the source intensity are automatically cancelled by the double beam photometer system.

Moreover, since both beams travel along substantially equivalent paths when they are separate and the same path when alternate portions of the beams are formed into a composite beam, the same amount of atmospheric absorption of radiant energy takes place in each beam, thus eliminating the source of error which arises when one beam is subject to more atmospheric absorption of radiant energy than the other. The null system has the advantage also of producing an output signal which reads directly in terms of percent transmission which is convenient for most purposes, such as infrared analysis, for instance. Additionally, the double beam type of instrument is convenient for differential analysis, a typical example of which may be the analysis of a material-in-solution. Using a double beam instrument, differential analysis may be performed conveniently and accurately by placing the sample-containing solution in the sample beam while pure solvent in like amount is placed in the reference beam.

The present invention is directed to an improved optical system for a double beam spectrophotometer and its primary object is to achieve the maximum efficient use of radiant energy available, using a minimum number of optical elements disposed and arranged in the smallest possible space.

An ancilliary object of the present invention is to minimize stray radiation in a spectrophotometer system.

Another object of the present invention is to provide a large, readily accessible, and conveniently positioned sampling area, facilitating use of the spectrometer and its accessories. Withal, the present invention necessarily must include the fundamental object of any two-beam null system, i.e., that of making the two beams of radiant energy as nearly the same as possible. Some of the advantages and features of the present invention which contribute to the sameness of both beams are that both beams undergo the same number of reflections when the beams traverse separate paths; the reflections are accomplished at substantially the same angle in each of the separate beams; the optical path lengths of the separate beams are the same; moreover, the present invention defines the extent of both beams by the same aperture stops and both beams follow the same path through the monochromator to the detector. The particular combination of elements comprising the spectrophotometer optical system uniquely arranged and disposed as conceived and taught by the present invention achieves all these highly desirable results simultaneously.

The unique advantages and features of the present invention will be better understood from a description of a typical embodiment which follows, when taken together with the drawings in which:

FIG. 1 is an illustration of an optical system embodying the present invention, and FIG. 2 is an illustration of a variant portion of the embodiment of FIG. 1.

Those skilled in the art will appreciate the compactness of the highly desirable arrangement of optical elements as illustrated by FIG. 1. A source of radiant energy S of uniform intensity is located adjacent a plane mirror 10 which reflects energy impinging thereon to two toroidal mirrors 11 and 12. The toroidal mirrors 11 and 12 are spaced opposite from plane mirror 10 and equidistant therefrom so as to form the radiant energy into two beams, a sample beam and a reference beam. Both beams are passed through a sampling area (generally indicated by the broken line outline) forming coplanar images 13 of the source S immediately beyond the sample area.

In accordance with well known double beam spectrometer practice, the sample to be analyzed is placed in the sample beam while an optical attenuator 14 is arranged to be positioned in the reference beam to adjust the amount of energy transmitted by the reference beam from that point on in the system so as to balance continuously the radiant energy contained in the two beams reaching the detector. If the sample is in solution, the pure solvent may be placed in the reference beam so that the output signal of the system is indicative of absorption by the sample only, a like amount of radiation having been absorbed by the solvent in both the sample and the reference beams.

An adjustable optical attenuator 15 is arranged and adapted to be positioned in the path of the sample beam. Unlike the reference beam attenuator 14, attenuator 15 remains in a set position after having been initially adjusted to establish the 100 percent transmission point of the system. The adjustable attenuator 15 affords a means of compensating for effects in the sample beam such as reflectance from the windows of sample cells, fog on the windows of the sample cell, etc.

A plane mirror 16 is positioned in the path of the reference beam so as to reflect it at right angles. Similarly, a plane mirror 17 is positioned in the path of the sample beam to reflect it at right angles so that the reference and sample beams are redirected along paths parallel to each other but in opposite directions. An additional plane mirror 18 is positioned in the path of the reflected sample beam to direct it to a point which is common with the reference beam. It should be noted that the plane mirror 18 is positioned in the path of the reflected sample beam so that the path length of the respective beams from the source images 13 to the common point where the two beams meet is of the same length.

An optical chopping device, such as the sector mirror 19, is positioned at the common point of the reference beam and the sample beam. The chopper 19 may typically comprise a rotatably driven semicircular mirrored surface. The chopper 19 is so arranged that, during one half of its operative cycle, it allows the sample beam to pass while, during the other half of its operative cycle, the semicircular reflective portion reflects the reference beam along the same path as that previously traveled by the sample beam but, at the same time, the sample beam strikes the back of the mirror and is blocked out. Thus, from the chopper 19 on, a common path is traversed by alternate and equal portions of the sample and reference beams.

A toroidal mirror 20 is positioned in the common path of the beams and is designed to reimage the source images 13 at a common point. An aperture stop 21 is positioned in the common path between the chopper 19 and the toroidal mirror 20 to limit the passage of radiation by a predetermined amount. The aperture stop 21 is positioned a distance $f_1$ from the toroidal mirror 20 which is equal to the focal length of the toroidal mirror 20.

A monochromator, indicated by the broken line outline 22, is located closely adjacent the sampling area of the spectrophotometer system. The entrance slit 23 of the monochromator 22 is located at the point at which the source images 13 are reimaged by the toroidal mirror 20. The composite beam is directed to the entrance slit 23 by appropriately positioned plane mirrors 24 and 25 so as to fold the optical path to make the most efficient use of the space required for the optical system.

The monochromator 22 is of the Littrow type and comprises entrance and exit slits 23 and 29; a collimating element 26 which may be a paraboloidal mirror, for instance; a dispersing element, such as the prism 27; and a Littrow mirror 28 adapted to be adjustably positioned in accordance with the wavelength program as is well known in the monochromator art. A necessary feature of the present embodiment is that the Littrow mirror 28 is positioned a distance $f_2$ from the collimator 26, where $f_2$ is the focal length of the collimator.

It should be appreciated that the distance $f_2$ is an optical distance which takes into account the refractive index of the dispersing element in the form of the prism 27. As will be clear to those skilled in the art, some wavelengths will traverse the prism near its base, which is a greater distance through the prism than that traversed by other extremities of wavelengths which will pass through a comparatively short distance of the prism near its apex. The distance $f_2$ is therefore calculated as a mean optical path length through a central portion of the prism.

This particular focal length relationship within the monochromator 22 operatively coacts with the disposition and optical characteristics of the aperture stop 21 and the toroidal mirror 20 as described hereinbefore to afford the unique and highly desirable results achieved by the present invention.

After having been dispersed by the prism 27, the radiant energy is returned to the collimator 26 and emerges from the monochromator 22 through the exit slit 29, which is positioned at the optical conjugate of the entrance slit 23. An optical element 30, such as the illustrated ellipsoidal mirror, is positioned in the path of the energy passing through the exit slit 29 to image the exit slit upon a radiation-sensitive detector 31, which may be a thermocouple.

The optical system of the present invention thus forms radiant energy from a single source into two equivalent beams, passes the beams separately through a comparatively large and easily accessible sample area, and thereafter alternately directs the beams along an identical common path through the monochromator and to the detector. Of particular importance is the fact that the aperture stop 21 is the optical conjugate of the Littrow mirror 28 and therefore the size of the aperture stop controls and determines the size of the beam at the Littrow mirror 28 (and substantially at the dispersing element such as prism 27, too). Thus, the beam of wanted wavelengths is established at the desired size by the aperture stop 21 and is the same for both beams. The unique arrangement of the present invention makes it possible to define and establish beam size outside the monochromator portion of the system, thus preventing unwanted and unnecessary energy from entering the monochromator. This, of course, eliminates possible sources of error.

Moreover, as will be apparent from the schematic diagram of FIG. 1 illustrating the present invention, the feature by which the beam size may be determined and limited in accordance with the concept of the present invention insures that the entire dimensions of the dispersing element, such as prism 27, are not irradiated by radiant energy of the beams. As a consequence, troublesome sources of stray radiation such as reflections and scattering from the corners of the prism are eliminated. The dispersing element used in the optical system of the present invention may be of the serrated type disclosed and claimed in copending application S.N. 667,452, filed June 24, 1957 in the names of E. Horace Siegler, Jr. and Hamilton W. Marshall, now Patent No. 2,972,277, issued Feb. 21, 1961, which is especially effective in minimizing scattered light when used in the optical system of the present invention wherein the beam size is determined and controlled by an aperture stop.

It should be noted that the sample and reference beams traverse optical paths of equal length to the common point at which they are combined and, in traversing their respective paths, undergo the same number of reflections in being transmitted to the one point. The beams are therefore subjected to substantially identical conditions, minimizing possible errors due to disparity between the beams. The toroidal mirrors which form the radiant energy into the reference and sample beams permit comparatively wide separation of the beams, facilitating convenient handling of sampling cells and accessories in the sample area. The use of toroidal mirrors additionally minimizes the number of elements required to form the two beams.

The aperture stop included in the optical system of the present invention to limit the passage of radiation of the composite beam to a predetermined amount, together with the toroidal mirror positioned one focal length from the aperture stop for reimaging the source images of the beam, contributes to minimizing errors from stray radiation and the like. The particular arrangement of the toroidal mirror and an aperture stop spaced one focal length from it, in combination with the Littrow type monochromator which includes a collimator and a dispersing element in its optical path one focal length from the collimator, insures that only a predetermined and desired part of the dispersing means is traversed by the radiation. In prior art optical systems, such as that described by John U. White and Max D. Liston at pages 29–35 of volume 40, No. 1, of the Journal of the Optical Society of America, no aperture stop was used because there was no point in the optical system common to both beams where such an aperture stop could be conveniently positioned. In that optical system, the dispersing element in the form of a prism effectively functioned as the aperture stop of the system inasmuch as it determined the aggregate or total amount of radiation transmitted through the system. This necessarily implied that the entire dimensions of the dispersing element, such as a prism, were irradiated, leading to stray radiation errors from unwanted reflections, the intermixture of different wavelengths of radiant energy, etc.

By contrast, the particular arrangement of the present invention affords a point common to both beams at which an aperture stop may be positioned to effectively determine the amount of radiation transmitted through the system. The aperture stop thus operates in identical fashion upon both beams and minimizes sources of inaccuracy from stray radiation and other error signals which were found in prior art systems.

It will be evident, however, to those skilled in the art that an optical system embodying the teaching of the present invention may use optical elements which differ specifically from those disclosed in the embodiment of FIG. 1 but which perform equivalent functions. As an example, the dispersing element of the present invention may comprise a grating rather than a prism. Similarly, although aspheric mirrors such as the toroidal configurations shown and described in connection with the embodiment of FIG. 1 offer especial advantages of a compact system, minimizing the number of optical elements required, spherical elements can also be employed where design considerations permit their use.

It is also contemplated by the present invention that, where the dispersing element is not located one focal length $f_2$ from the collimator, the aperture stop may be positioned at the optical conjugate of the dispersing element. It is possible to design a system in accordance with the teaching of the present invention in which the optical conjugate of the dispersing element is located at a point before the beams are combined to traverse a common path. In such a case, two apertures are required, one in each of the separate beams and the two apertures, in addition to being placed at the optical conjugate of the dispersing element, must also be adjusted to be optically coincident. Such an arrangement is illustrated in FIG. 2, where it will be noted that the aperture stops 21a and 21b are positioned in the reference and sample beams, respectively, before the beams are combined to follow a common path.

Thus, it will be seen that where the beams follow separate paths in the optical system of the present invention they are equivalent. The equivalency of the beams is achieved by employing but one source of radiant energy, by having the same optical path length for both beams, by obviating disparity between the two beams due to atmospheric absorption, by arranging the beams to undergo the same number of reflections, by having such reflections take place at approximately the same angle of incidence in the respective beams, and by minimizing the number of mirrors used in the separate paths.

The particular disposition of the optical elements of the present invention where the beams traverse separate paths is so conceived as to afford convenient separation in the sampling area, as well as compact arrangement of the entire system. In that portion of the system of the present invention where the beams traverse a common path, i.e., from the chopper 19 to the radiation-sensitive detector 31, the beams are identical.

The size of both beams as to width is defined therefore by the aperture stop 21 and the entrance slit 23 of the monochromator. The height of both beams is defined by the optical attenuator 14 in the reference beam and its counterpart 15 in the sample beam. Both the beams emerging from the monochromator are of the same wavelength because the exit slit 29 of the monochromator is common to both beams and is located at the optical conjugate of the entrance slit 23 of the monochromator. The unique arrangement of the optical system of the present invention assures that both beams have the same path through the prism. This is especially important in those wavelength regions where the prism material absorbs a significant amount of radiation, since different absorption as between the two beams due to causes other than sample absorption will give rise to errors in the detected signal. The present invention also assures that scattered radiation is reduced much below that found in prior art systems. This is accomplished by features of the present invention which make it possible to so control the wanted radiation beam that it is incident only on optical surfaces. The present invention also minimizes scattered light from portions of optical elements, such as the corners of a prism, where used as a dispersing element.

Additionally, since the radiation is controlled so as to only be incident upon optical surfaces, there is no scattered light from the prism mount, or other structures which may happen to be positioned near the optical path of the system. Moreover, the manner in which the radiation employed in the optical system of the present invention is controlled enhances the effectiveness of the particular form of serrated prism disclosed in the aforementioned copending application S.N. 667,452.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. A null balance spectrophotometer optical system for directing radiant energy from a source to a radiation-sensitive detector comprising means for producing two substantially identical coplanar images of said source, said means including reflective optical elements arranged to direct two beams of said energy through a sample space between said source and its images, means for combining alternate time-displaced portions of said beams into a composite beam directed along a common optical path, means for reimaging the source images at a common point, a Littrow-type monochromator including a collimator, a dispersing element, and having entrance and exit slits, said entrance slit being positioned at the source reimaging point and said exit slit being positioned at an optical conjugate of said entrance slit, aperture stop means positioned in the composite beam outside the monochromator and at the optical conjugate of the Littrow element for limiting the size of said radiation beams, and means for imaging the exit slit of said monochromator on said radiation-sensitive detector.

2. A null balance spectrophotometer optical system for directing radiant energy from a source to a radiation-sensitive detector comprising means for producing two substantially identical coplanar images of said source, said means including reflective optical elements arranged to direct two beams of said energy through a sample space between said source and its images, means for combining alternate time-displaced portions of said beams into a composite beam directed along a common optical path, means for reimaging the source images at a common point, said beams including a toroidal mirror positioned in said common path a distance $f_1$ beyond said aperture stop, where $f_1$ is the focal length of said toroidal mirror, a Littrow-type monochromator including a collimator, a dispersing element, and a Littrow mirror positioned a distance $f_2$ from said collimator, where $f_2$ is the focal length of said collimator, and having entrance and exit slits, said entrance slit being positioned at the source reimaging point and said exit slit being positioned at an optical conjugate of said entrance slit, an aperture stop positioned outside the monochromator and in said common path for limiting the passage of radiation, and means for imaging said exit slit of said monochromator on said radiation-sensitive detector.

3. A null balance spectrophotometer optical system for directing radiant energy from a source to a radiation-sensitive detector comprising means for producing two substantially identical coplanar images of said source, said means including two identical toroidal mirrors positioned to direct two beams of said energy through a sample space between said source and its images, means for directing said beams to a common point through an equal number of reflections and along paths of equal optical length, means positioned at said common point for alternately directing said beams along a common single path, means for reimaging the source images at a common point, said means including a mirror positioned in said common path a distance $f_1$ beyond said aperture stop, where $f_1$ is the focal length of said mirror, a Littrow type monochromator including a collimator, a dispersing element, and a Littrow mirror positioned a distance $f_2$ from said collimator, where $f_2$ is the focal length of said collimator, and having entrance and exit slits, said entrance slit being positioned at the source reimaging point and said exit slit being positioned at a conjugate of said entrance slit, an aperture stop positioned outside the monochromator and in said common path for limiting the passage of radiation, and means for imaging said exit slit of said monochromator on said radiation-sensitive detector.

4. A null balance spectrophotometer optical system for directing radiant energy from a source to a radiation-sensitive detector comprising a plane mirror positioned adjacent said source, identical toroidal mirrors positioned equidistant and opposite from said plane mirror for producing two substantially identical images of said source, said radiant energy being transmitted in the form of two identical parallel beams directed through a sample space between said source and its images, a plane mirror positioned in the path of each beam beyond said images for reflecting said beams along parallel paths toward each other, a plane mirror arranged to direct one of said beams to a point common to said other beam, a semicircular plane mirror adapted to be rotated through said common point for alternately directing said beams along a common path, means for reimaging the source images at a common point, said means including a toroidal mirror positioned in said common path a distance $f_1$ beyond said aperture stop, where $f_1$ is the focal length of said toroidal mirror, a Littrow-type monochromator having entrance and exit slits, said entrance slit being positioned at the source reimaging point and said exit slit being positioned at a conjugate of said entrance slit, and including a collimating mirror positioned to receive the radiation from said entrance slit and dispersing means in receiving relationship to the radiation reflected from the collimating mirror to return at least a portion of said radiation to said collimating mirror, the distance between said collimating mirror and said dispersing means being such that monochromatic radiation leaving said collimating mirror and returning thereto travels a distance of $2f_2$, where $f_2$ is the focal length of said collimating mirror, an aperture stop positioned outside the monochromator and in said common path for limiting the passage of radiation and means for imaging the exit slit of said monochromator on said radiation-sensitive detector.

5. A null balance spectrophotometer optical system for directing radiant energy from a source to a radiation-sensitive detector comprising a plane mirror adjacent said source, two identical toroidal mirrors positioned equidistant from and in source reflecting relationship with said plane mirror, said toroidal mirrors having their major optical axes parallel to on another and to said plane mirror for directing first and second beams of said energy through a sample space between said source and its images, first and second plane mirrors positioned in the paths of said first and second beams respectively beyond said images for reflecting said beams along parallel paths toward each other, a third plane mirror positioned in the path of said first beam to reflect it to a point of coherent intersection with said second parallel beam, a semicircular mirror adapted to be rotated through said point of intersection for alternately allowing passage of said first beam and then intercepting said first beam while reflecting said second beam along a path common to both beams, a third toroidal mirror positioned in said common path for reimaging the source images of said combined beams, said toroidal mirror being positioned at a distance $f_1$ from said aperture stop, where $f_1$ the focal length of said toroidal mirror, two plane mirrors aligned to reflect the energy from said toroidal mirror to the entrance slit of a Littrow-type monochromator having an entrance slit and an exit slit, said exit slit being positioned at a conjugate of said entrance slit, said monochromator including a paraboloidal mirror positioned to receive the radiation from said entrance slit and dispersing means in receiving relationship to the radiation reflected from the paraboloidal mirror to return at least a portion of said radiation to said paraboloidal mirror, the distance between said paraboloidal mirror and said dispersing means being such that monochromatic radiation leaving said paraboloidal mirror and returning thereto travels a distance of $2f_2$ where $f_2$ is the focal length of said paraboloidal mirror, an aperture stop positioned outside the monochromator and in said common path for limiting the passage of radiation, and an ellipsoidal mirror positioned to image the exit slit of said monochromator on said radiant-sensitive detector.

References Cited in the file of this patent

UNITED STATES PATENTS

| | | |
|---|---|---|
| 2,314,800 | Pineo | Mar. 23, 1943 |
| 2,562,525 | Cary | July 31, 1951 |
| 2,679,185 | Atwood | May 25, 1954 |
| 2,817,769 | Siegler et al. | Dec. 24, 1957 |